Sept. 20, 1971 R. WILKS ETAL 3,605,667
AIRCRAFT FUEL TANK AND METHOD OF MAKING SAME
Filed Oct. 21, 1968 2 Sheets-Sheet 1
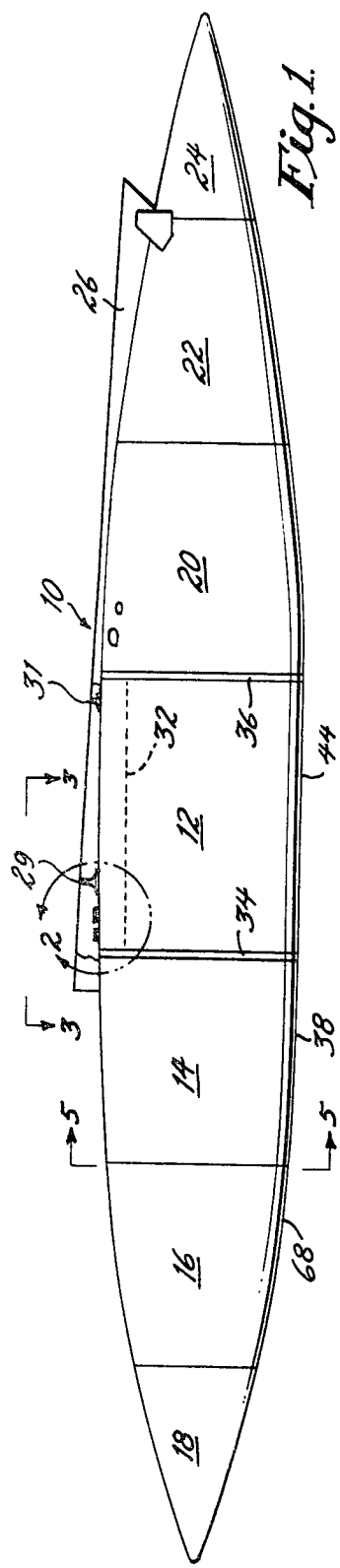
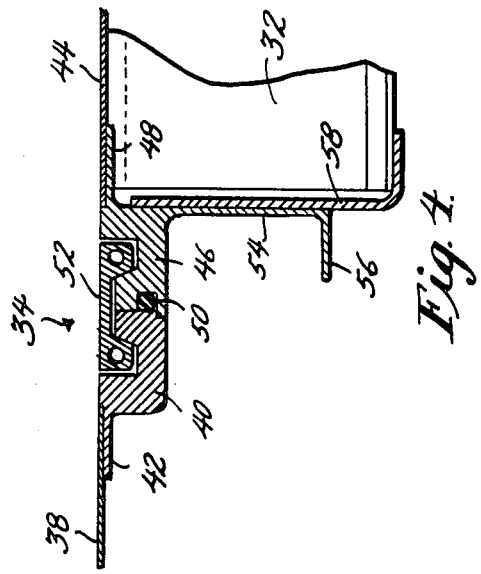
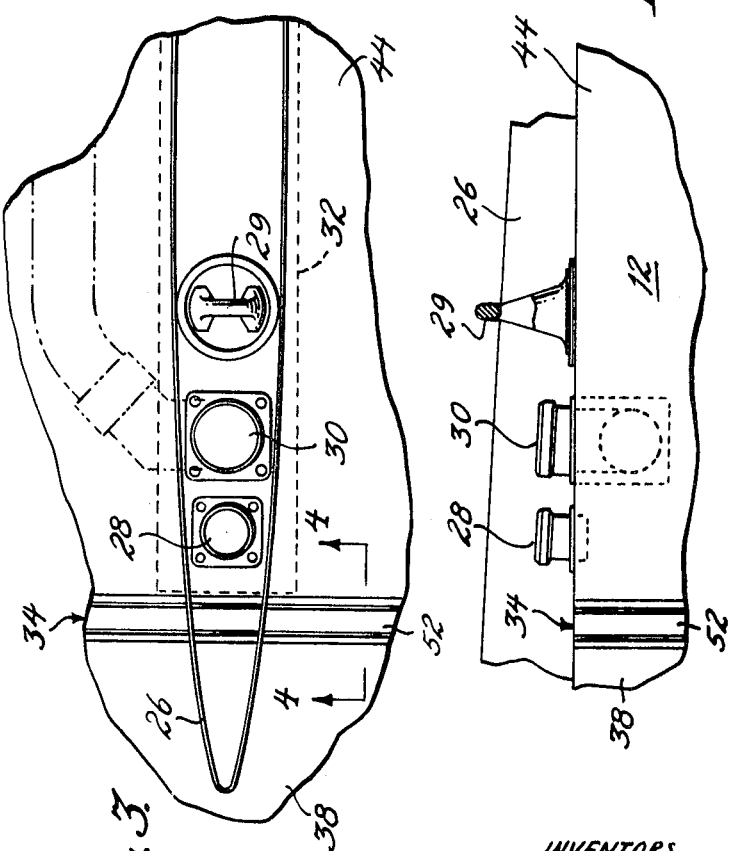
INVENTORS.
RONALD WILKS
EMIL C. WOJCIK
BY Seidel & Gonda
ATTORNEYS.

Sept. 20, 1971 R. WILKS ETAL 3,605,667
AIRCRAFT FUEL TANK AND METHOD OF MAKING SAME
Filed Oct. 21, 1968 2 Sheets-Sheet 2
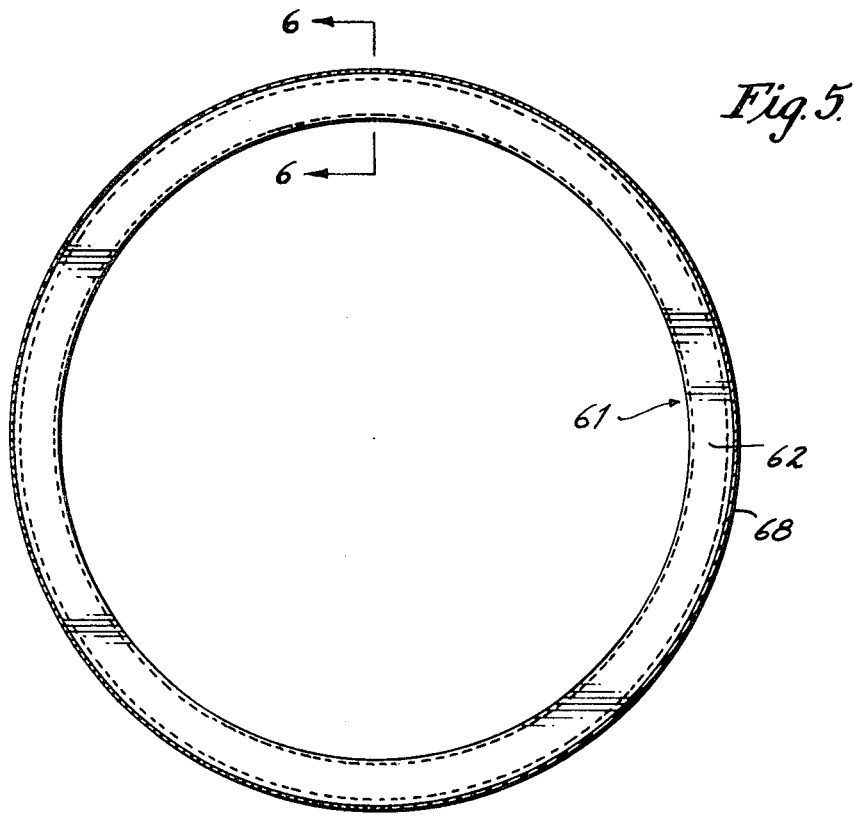
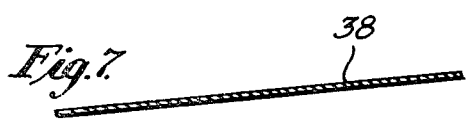
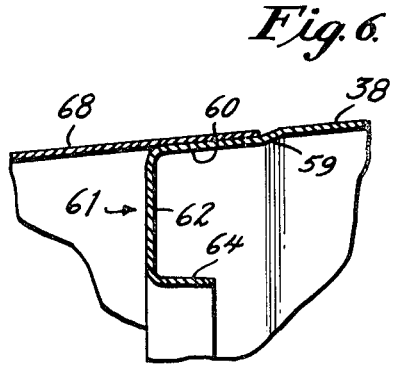
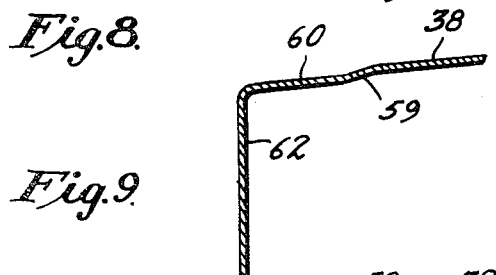
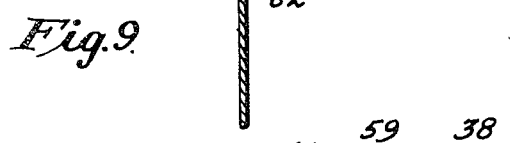
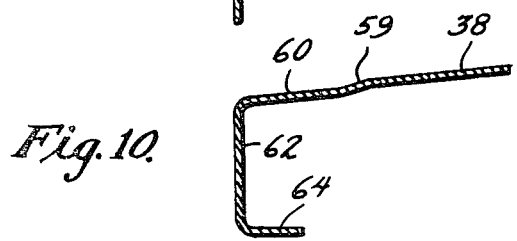
INVENTORS.
RONALD WILKS
EMIL C. WOJCIK
BY Seidel & Gonda
ATTORNEYS.

United States Patent Office 3,605,667
Patented Sept. 20, 1971

3,605,667
AIRCRAFT FUEL TANK AND METHOD OF MAKING SAME
Ronald Wilks, Berwyn, and Emil C. Wojcik, Brookhaven, Pa., assignors to Day & Zimmermann, Inc., Philadelphia, Pa.
Filed Oct. 21, 1968, Ser. No. 769,244
Int. Cl. B21d 51/00
U.S. Cl. 113—120R
3 Claims

ABSTRACT OF THE DISCLOSURE

An aircraft fuel tank is provided which need not be jettisoned when flying over Mach I and which is aerodynamically stable. Tank sections are conical spun sections except for the center cylindrical section containing all of the plumbing. Each spun section has an integral reinforcement frame at one end. Unassembled tanks can be stacked and assembly time in the field is substantially less than ninety man minutes.

---

This invention relates to an aircraft fuel tank and method of making the same. Heretofore, many external aircraft fuel tanks made in accordance with existing MIL specifications had to be jettisoned when flying over Mach I because they were aerodynamically unstable. The tank of the present invention has no protuberances so as to make the tank aerodynamically unstable even at speeds in excess of Mach I. On some aircraft it is necessary to mount the tank on the center line thereof in order for the tank to be stable at such speeds.

The specifications also require a particular stacking ratio, that is a specified number of unassembled tanks must be storable in the amount of space occupied by an assembled tank. The specifications further require the tank to be capable of assembly in the field in less than ninety man minutes.

The present tank can be assembled in the field in about thirty man minutes. The tank is lightweight and preferably made from a material such as aluminum so that it may hold 600 gallons of fuel while weighing only 275 pounds; and is capable of withstanding proof pressures internally of negative 7 p.s.i.g. to positive 23 p.s.i.g. The cylindrical center section is preassembled and tested at the factory. By locating all of the plumbing (conduits, valves, fittings, instruments, gauges) in the center section, reliability is substantially increased while assembly time in the field is substantially decreased.

In accordance with the method of the present invention, a tank for use on aircraft is made using a substantially cylindrical center section having a skin with an annular reinforcement frame at each end. Similarly constructed nose and tail portions are formed. The forming of the nose portion includes spinning one end of a nose section to provide an integral annular reinforcement frame and flange for receiving one end of an adjacent nose section in overlapping flat relationship. The tail portion is formed in a similar manner. Thereafter, the nose and tail portions are joined to the center section. A more detailed description of the method is disclosed hereinafter.

It is an object of the present invention to provide a novel method of making tanks for use on aircraft subject to flying speeds in excess of Mach I.

It is another object of the present invention to provide a novel method for making aircraft fuel tanks which are light in weight while being sufficiently rigid to withstand the pressures effected when flying with fuel tanks at speeds in excess of Mach I.

It is another object of the present invention to provide a novel method for making aircraft fuel tanks involving spinning the skin for various sections of the nose and tail portions of the tank.

It is another object of the present invention to provide a novel aerodynamically stable fuel tank and method for making the same which can be assembled in the field in about thirty man minutes and which does not have to be jettisoned when flying above Mach I.

It is another object to provide tanks for use on aircraft which will not fail due to the joints springing under surge conditions.

It is another object to provide an aircraft tank which when empty and mounted on the aircraft can have its nose section removed to permit adjustments.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a side elevation view of the fuel tank.

FIG. 2 is a partial side elevation view of the tank shown in FIG. 1 but on an enlarged scale.

FIG. 3 is a partial plan view taken along the line 3—3 in FIG. 1 and on an enlarged scale.

FIG. 4 is a sectional view taken along the line 4—4 in FIG. 3 and on an enlarged scale.

FIG. 5 is a sectional view taken along the line 5—5 in FIG. 1 and on an enlarged scale.

FIG. 6 is a sectional view taken along the line 6—6 in FIG. 5.

FIGS. 7–10 illustrate a sequence of method steps performed during the spinning of either the tail or nose sections.

Referring to the drawing in detail, wherein like numerals indicate like elements, there is shown in FIG. 1 an aircraft fuel tank designated generally as 10. The tank includes a center section 12 which is generally cylindrical, a nose portion, and a tail portion. The nose portion includes nose sections 14, 16 and 18. The tail portion includes tail sections 20, 22 and 24. While each portion is comprised of three sections, a greater or lesser number may be utilized as desired. For ease of handling and for economical reasons, three sections are preferred.

A fairing or pylon 26 is provided at the top of the tank 10, and includes an upright wall extending from section 14 to section 22. Within the fairing, which lacks a top wall, there are provided an air inlet 28, fuel inlet 30, and lifting lugs 29 and 31. Said inlets and lifting lugs are mounted on the center section 12. All of the plumbing associated with the tank 10 is factory installed and tested within the center section 12. Center section 12 is provided internally with an axially extending reinforcement structure 32 in line with and below the inlets and lifting lugs described above. Reinforcement structure 32 takes the weight of the tank so that the lifting lugs are not supported solely by the skin of center section 12.

Center section 12 is connected to nose section 14 by a joint 34 which lacks any protuberances which would interfere with the aerodynamic configuration of the tank 10. A similar joint 36 is provided between the other end of center section 12 and the tail section 20. The joints 34 and 36 are identical. Hence, only joint 34 will be described in detail.

The joint 34 is shown in detail in FIG. 4. Skin 38 on nose section 14 overlies flange 42 on ring 40 so as to be flush with the outer periphery of ring 40. Skin 38 and flange 42 are welded together. Skin 44 on center section 12 is welded to the upper surface of flange 48 on reinforcement frame 46. Skin 44 is flush with the outer periphery on frame 46. Ring 40 and frame 46 abut one another and an O-ring seal 50 is provided therebetween. The joint 34 will not roll or spring due to surges.

The outer periphery of ring 40 and frame 46 are provided with a U-shaped groove extending circumferentially therearound. Each groove is coextensive with the meeting faces on the ring 40 and frame 46. A separable retainer ring 52 is disposed within the grooves on frame 46 and ring 40 and flush therewith so as to provide a smooth outer peripheral surface. Retainer ring 52 includes a conventional means for tightening the same so that the converging surfaces on the ring 52 force the ring 40 and frame 46 into tight abutting engagement without affecting aerodynamic stability.

Frame 46 has an integral radially extending angular flange 54 which terminates at its inner periphery in an axially extending flange 56. Flange 56 has secured to it a plate 58 which supports one end of the channel structure 32. A similar plate is supported by the joint 36 for supporting the other end of the channel structure 32.

In FIG. 6 there is disclosed a typical joint between adjacent sections of the nose portion and tail portion. As illustrated therein, the joint is between the nose sections 14 and 16. Each of the sections is conical. Sections 14, 16, 20 and 22 terminate at one end in a straight portion and at their other end in an integral reinforcement frame. For example, the skin 38 on section 14 is straight at its righthand end as shown more clearly in FIG. 4 and at its lefthand end as shown in FIG. 6 terminates in an integral reinforcement frame designated generally as 61.

The frame 61 on skin 38 adjacent section 16 includes an inwardly directed offset portion 59 and an annular frusto-conical flange 60. Flange 60 telescopically receives the righthand end of skin 68 on section 16 so as to form a continuation of skin 38. Skin 68 and flange 60 may be joined together in any convenient manner compatible with military or commercial specifications, such as by welding, so as to be leakproof, without creating protuberances. Such joining is done in the factory under control conditions.

For internally reinforcing the nose portion at the joint, frame 61 includes a radially inwardly directed flange 62 and an axially directed flange 64. The steps for forming the reinforcement frame 61 at the lefthand end of the skin 38 so as to have the same thickness of the skin is shown sequentially in FIGS. 7-10. Each of the forming steps in FIGS. 7-10 involves shear spinning whereby the nose section is rotated with respect to a tool which likewise rotates. Spinning of metal is per se old in the art of machining. However, shear spinning the sections has the advantage of permitting the thickness of the sections to vary.

The point between nose sections 16 and 18 is identical with that illustrated between sections 14 and 16. The joint between tail sections 20 and 22 as well as the joint between sections 22 and 24 may be identical with that illustrated in FIG. 6. The skin for the various sections is preferably aluminum. For a 600 gallon center line tank, the sections have a thickness of about .080 inch with an integral reinforcement frame on one end of each section. A greater or lesser thickness may be used depending on the tank size. It will be noted that the reinforcement frame is located at the overlapping flush joint between the various sections to provide for aerodynamic rigidity as well as mechanical and structural strength utilizing lightweight materials. It will be apparent that most of the weight of the tank 10 is concentrated in center section 12 which contains all of the plumbing.

Tanks made in accordance with the present invention may be stacked one inside the other for economic utilization of storage space. The various nose and tail sections may be assemble to the center section in the field in less than thirty man minutes as described above. Except for the joining of the center section to the nose section and tail section, the tank is assembled and ready to use.

In view of the above description, a more detailed explanation of the tank or its method of manufacture need not be explained.

The present invention may be embodied in other specific forms without departing from the spirit or essential attributes thereof and, accordingly, reference should be made to the appended claims, rather than to the foregoing specification as indicating the scope of the invention.

It is claimed:

1. In a method for making a streamlined external aircraft fuel tank of the type comprising a plurality of sections in the form of shells of generally circular cross-section and varying longitudinal profile, the steps of spin forming first edge portions of said shells to form thereon flanges having frusto-conical outer peripheral surfaces inwardly offset by about the wall thickness of the shell, deforming distal edge portions of said offset flanges by spin forming to provide an integral rigidifying frame extending inwardly toward the longitudinal axis of said shells, said step of deforming distal edge portions including forming a radially inwardly directed flange, and then deforming an edge portion of the radially inwardly directed flange to form an axially directed flange, placing second edge portions of respective shells of suitable dimensions in overlying and complementary relation with said frusto-conical surfaces, and joining said second edge portions to said frusto-conical surfaces to provide an externally smooth continuous aerodynamic shape.

2. In a method in accordance with claim 1, said joining step being performed by welding.

3. In a method for making a streamlined external aircraft fuel tank of the type comprising a plurality of sections in the form of shells of generally circular cross-section, the steps of spin forming first edge portions of said shells to form thereon flanges having outwardly facing surfaces inwardly offset by about the wall thickness of the shells, deforming distal edge portions of said offset flanges by spin forming to provide an integral rigidifying frame extending inwardly toward the longitudinal axis of the shell, said step of deforming distal edge portions including forming a radially inwardly directed flange, and then deforming an edge portion of the radially inwardly directed flange to form an axially directed flange, and then placing second edge portions of respective shells of suitable dimensions in overlying and complementary relation with said outwardly facing surfaces, and joining the second edge portions to the outwardly facing surfaces to provide an externally smooth continuous aerodynamic shape.

References Cited

UNITED STATES PATENTS

| 2,160,975 | 6/1939 | Matter et al. | 113—120 |
| 2,541,371 | 2/1951 | Kops | 220—5A |
| 2,661,115 | 12/1953 | Fletcher | 220—5A |
| 2,984,439 | 5/1961 | Fletcher | 244—130 |
| 2,612,857 | 10/1952 | Jones | 29—482 |
| 2,826,804 | 3/1958 | Wickwire et al. | 29—159 |
| 3,494,162 | 2/1970 | Hansson | 113—120 |
| 3,430,594 | 3/1969 | Dolveck | 113—120 |
| 3,246,794 | 4/1966 | Marshall | 29—482 |

FOREIGN PATENTS

| 665,104 | 9/1929 | France | 113—120 |

CHARLES W. LANHAM, Primary Examiner

M. J. KEENAN, Assistant Examiner

U.S. Cl. X.R.

113—116R, 116W, 120H; 29—482